United States Patent
Rosvall et al.

(10) Patent No.: US 11,326,266 B2
(45) Date of Patent: May 10, 2022

(54) ELECTRODE

(71) Applicant: Akzo Nobel Chemicals International B.V., Arnhem (NL)

(72) Inventors: Magnus Rosvall, Gothenburg (SE); Ezio Amerio, Deventer (NL); John Gustavsson, Östersund (SE); Susanne Holmin, Sundsvall (SE); Lars-Erik Bergman, Ljungaverk (SE)

(73) Assignee: NOURYON CHEMICALS INTERNATIONAL B.V., Arnhem (NL)

(*) Notice: Subject to any disclaimer, the term of this patent is extended or adjusted under 35 U.S.C. 154(b) by 379 days.

(21) Appl. No.: 15/761,127

(22) PCT Filed: Sep. 22, 2016

(86) PCT No.: PCT/EP2016/072511
§ 371 (c)(1),
(2) Date: Mar. 19, 2018

(87) PCT Pub. No.: WO2017/050873
PCT Pub. Date: Mar. 30, 2017

(65) Prior Publication Data
US 2018/0265996 A1 Sep. 20, 2018

(30) Foreign Application Priority Data
Sep. 25, 2015 (EP) .................... 15186817

(51) Int. Cl.
*C25B 11/093* (2021.01)
*C25B 11/051* (2021.01)
(Continued)

(52) U.S. Cl.
CPC ............ *C25B 11/093* (2021.01); *C25B 1/265* (2013.01); *C25B 11/051* (2021.01); *C25C 7/02* (2013.01);
(Continued)

(58) Field of Classification Search
CPC ............ C25B 1/26–1/265; C25B 1/34; C25B 11/02–11/035; C25B 11/0405;
(Continued)

(56) References Cited

U.S. PATENT DOCUMENTS 3,755,103 A   8/1973 Grotheer et al.
4,039,400 A * 8/1977 Hayfield .............. C25B 11/0484
                                                                205/171
(Continued)

FOREIGN PATENT DOCUMENTS

CN    1030617 A    1/1989
CN    1900368 A    1/2007
(Continued)

OTHER PUBLICATIONS

Camara ("Electrochemical response of titanium and chromium mixed oxides on titanium substrates"), Journal of Electroanalytical Chemistry and Interfacial Electrochemistry, vol. 284, Issue 1, May 10, 1990, pp. 155-172). (Year: 1990).*
(Continued)

*Primary Examiner* — Alexander W Keeling
(74) *Attorney, Agent, or Firm* — Lorenz & Kopf, LLP (57) ABSTRACT

An electrode (10) is disclosed. The electrode (10) comprises an electrode substrate (20). A layer of $TiO_x$ (30, 40) with a total thickness in the range of between 40-200 μm is present on at least one surface of the electrode substrate (20) and a porosity of layer of $TiO_x$ (30, 40) is below 15%. An electrocatalytic layer (50) comprising oxides of ruthenium and cerium according comprising at least 50 molar % ruthenium oxides is present on layer of $TiO_x$ (30, 40) and wherein x is in the range 1-2 for the layer of $TiO_x$. A process for the manufacture of the electrode (10) is disclosed as are uses thereof.

24 Claims, 7 Drawing Sheets

(51) Int. Cl.
  *C25B 1/26* (2006.01)
  *C25C 7/02* (2006.01)
  *C25D 17/10* (2006.01)
  *C02F 1/461* (2006.01)

(52) U.S. Cl.
  CPC .... *C25D 17/10* (2013.01); *C02F 2001/46142* (2013.01)

(58) Field of Classification Search
  CPC ........ C25B 11/0442; C25B 11/0447–11/0468; C25B 11/0478; C25B 11/0494; C25B 11/00–11/18; C25B 11/04–11/097; C02F 1/46109; C02F 2001/46133; C02F 2001/46138; C02F 2001/46142
  See application file for complete search history.

(56) References Cited

U.S. PATENT DOCUMENTS

| | | | |
|---|---|---|---|
| 4,140,813 A | 2/1979 | Hund et al. | |
| 4,422,917 A * | 12/1983 | Hayfield | C25C 7/02 204/196.01 |
| 4,524,091 A | 6/1985 | Blaauw et al. | |
| 4,900,419 A | 2/1990 | Nishiki et al. | |
| 5,622,613 A * | 4/1997 | Arimoto | C25B 1/26 205/464 |
| 5,665,218 A * | 9/1997 | Ashizawa | C25D 17/10 205/171 |
| 6,103,299 A * | 8/2000 | Shimamune | C25B 11/041 427/126.3 |
| 2004/0151896 A1* | 8/2004 | Houda | C25B 11/0473 428/327 |
| 2018/0258543 A1* | 9/2018 | Rosvall | C25B 11/0431 |

FOREIGN PATENT DOCUMENTS

| | | | |
|---|---|---|---|
| CN | 102471904 A | 5/2012 | |
| CN | 102918184 A | 2/2013 | |
| EP | 0 298 055 A1 | 1/1989 | |
| EP | 0298055 A1 * | 1/1989 | ........... C25B 11/093 |
| GB | 1 443 502 A | 1/1975 | |
| WO | 2011/012596 A1 | 2/2011 | |
| WO | 2011/157811 A1 | 12/2011 | |
| WO | 2017/050867 A1 | 3/2017 | |

OTHER PUBLICATIONS

Hachiya et al ("Ruthenium Oxide Cathodes for Chlor-Alkali Electrolysis", ECS Transactions, 16, 39, 2009, pp. 31-39) (Year: 2009).*
International Search Report and Written Opinion for PCT/EP2016/072511, dated Nov. 14, 2016.
European Search Report for 15186817.1-1360 dated Nov. 19, 2015.
Zeradjanin et al., Utilization of the catalyst layer of dimensionally stable anodes—Interplay of morphology and active surface area, Electrochimica Acta, 2012, 408-414.
Massimo Guglielmi, Sol-Gel Coatings on Metals, Journal of Sol-Gel Science and Technology, vol. 8., 1997, 443-449.

* cited by examiner

ELECTRODE

This application is a national stage filing under 35 U.S.C. § 371 of PCT/EP2016/072511, filed Sep. 22, 2016, which claims priority to European Patent Application No. 15186817.1, filed Sep. 25, 2015, the contents of each of which are each incorporated herein by reference in their entirety.

FIELD OF INVENTION

The present invention relates to an electrode, a use of the electrode and a method for the manufacture of the electrode.

BACKGROUND OF INVENTION

During an electrolytic process in an aqueous solution, a reaction that occurs at a cathodically polarised electrode is a production of hydrogen gas. The formation of hydrogen can be as $H_2$ and/or atomic hydrogen. An example of the electrolytic process is a manufacture of sodium chlorate ($NaClO_3$).

In the electrolytic process for the manufacture of $NaClO_3$ a titanium comprising cathode is sometimes used as an alternative to steel, as the titanium comprising cathode is corrosion resistant. However the titanium comprising cathode has limitations, such as a poor overpotential (i.e. extra voltage is needed to drive a current) and a tendency to form titanium hydrides. The poor overpotential can to an extent be overcome by a use of a conductive layer, comprising for example, an active catalytic species such as $RuO_2$ on the titanium comprising cathode.

However due to the production of hydrogen ($H_2$ and/or atomic hydrogen), problems associated with titanium hydride formation exist.

Hydrogen ($H_2$ and/or atomic hydrogen) can penetrate the conductive layer to the titanium comprising core (i.e. electrode substrate) and react with the titanium comprising core (i.e. electrode substrate) to form titanium hydride. The hydrides of titanium are more brittle than the titanium comprising core (i.e. electrode substrate) and therefore compromise a longevity and/or mechanical integrity of the electrode.

The hydrides of titanium have an expanded lattice structure which compromises an adhesion of the conductive layer on the titanium comprising core (i.e. electrode substrate), which causes a detachment of the conductive layer from the titanium comprising core (i.e. electrode substrate).

The detachment of the conductive layer from the titanium comprising core (i.e. electrode substrate) leads to a loss of efficiency of the cathode and a loss of efficiency of the electrolytic process. The detachment of the conductive layer from the titanium comprising core (i.e. electrode substrate) leads a reduction of an active surface area of the electrode, which in turn leads to an increased current density in other parts of the cathode which are not damaged, resulting in increased hydrogen evolution and therefore accelerated deterioration of the cathode. The hydrogen ($H_2$ and/or atomic hydrogen) penetrates to the titanium comprising core (i.e. electrode substrate) and leads to the formation of titanium hydrides, which in turn compromises an electrical effectiveness of the conductive layer on the electrode.

Over time, the cathodes need to be machined to remove the spent catalytic layer and other conductive layers on the titanium comprising core (i.e. electrode substrate) and to remove the hydrides, before the titanium comprising core (i.e. electrode substrate) can be re-coated. This machining and re-coating is an expensive, time consuming procedure and causes down-time in the electrolytic process.

There is a need to provide an electrode, a method for the manufacture of the electrode and uses thereof, which overcome at least some of the aforementioned problems.

U.S. Pat. No. 4,039,400 discloses an electrode and a process for the manufacture of an electrode. The process comprises inserting an electrode substrate which has a surface of nickel or lead, into a solution of titanium ions and forming a first electro-coating of titanium oxide by electro-coating the solution of titanium ions onto the electrode substrate by drying and calcination. The process is repeated to form a second electro-coating of titanium oxide on the first electro-coating of titanium oxide. The process further comprises applying a metal or an oxide thereof of the platinum group (platinum-iridium alloys and ruthenium dioxide) to the second electro-coating of titanium oxide.

EP 0298055 discloses a cathode for electrolysis. The cathode comprises a nickel electrode substrate, or a nickel coated steel electrode substrate. The electrode substrate is coated with a layer comprising at least one platinum group metal, oxide or hydroxide and at least one cerium group metal, oxide or hydroxide.

CN1900368A discloses a titanium anode in the manufacture of chlorine. The titanium anode is coated with oxides of ruthenium and cerium in an amount of $RuO_2:CeO_2$ molar ratio 1:3-3:1.

SUMMARY OF INVENTION

In a first aspect the present invention relates to an electrode. The electrode comprises an electrode substrate. A layer of $TiO_x$ with a total thickness in the range of between 40-200 µm is present on at least one surface of the electrode substrate and a porosity of the layer of $TiO_x$ is below 15%. An electro-catalytic layer comprising oxides of ruthenium and cerium comprising at least 50 molar % ruthenium oxides is present on the layer of $TiO_x$ and wherein x is in the range 1-2 for the layer of $TiO_x$.

In the electrode according to the present invention, it has been found that the electro-catalytic layer remains adhered to the layer of $TiO_x$ and does not unfavourably percolate within the layer of $TiO_x$. The electrode according to the present invention has enhanced durability and/or mechanical integrity whilst maintaining catalytic activity. The electrode is resilient to hydrogen diffusing to the electrode substrate, therefore the electrode substrate does not suffer from hydride formation and maintains its structural integrity. The electrode exhibits enhanced structural integrity of the layer of $TiO_x$ in the vicinity of the electro-catalytic layer. The electrode exhibits enhanced adhesion of the layer of $TiO_x$ to the electrode substrate and is devoid of any cracking.

In a further aspect the present invention relates to a use of the electrode as a cathode in an electrolytic process.

The cathode maintains its cathodic current efficiency, i.e. the production of hydrogen gas remains constant at the same current, indicating that no degradation of the cathode occurs due to hydrogen ($H_2$ and/or atomic hydrogen) penetration. The titanium comprising core (i.e. electrode substrate) is devoid of hydrides and therefore a need for machining and recoating is eliminated meaning that the cathode has a longer service life. The cathode maintains its voltage in that no, or only minor extra voltage is needed to drive a current to maintain the same hydrogen production level in the electrolysis process.

The cathode does not show significant changes in its morphology during the production of hydrogen gas. The cathode is impermeable to hydrogen ($H_2$ and/or atomic hydrogen) penetration whilst maintaining catalytic activity at its surface. The electrode exhibits reduced dissolution of the electro-catalytic layer into a bulk electrolyte when used in an electrolytic process.

In a further aspect the present invention relates to a process of manufacturing an electrode. The process comprising the steps:
   i) providing an electrode substrate,
   ii) coating at least one surface of the electrode substrate by plasma spraying to form a layer of $TiO_x$ with a total thickness in the range of between 40-200 μm on at least one surface of the electrode substrate to provide a porosity of the layer of $TiO_x$ of below 15%,
   iii) forming an electro-catalytic layer comprising oxides of ruthenium and cerium comprising at least 50 molar % ruthenium oxides on the layer of $TiO_x$ and wherein x is in the range 1-2 for the layer of $TiO_x$.

The process according to the present invention provides an electrode that exhibits enhanced adhesion of the layer of $TiO_x$ to the electrode substrate and enhanced adhesion of the electro-catalytic layer on the layer of $TiO_x$. The process ensures that the electro-catalytic layer does not substantially percolate within the layer of $TiO_x$. The process provides a mechanically stable electrode with a high catalytic activity.

DETAILED DESCRIPTION

For a complete understanding of the present invention and the advantages thereof, reference is made to the following detailed description taken in conjunction with the accompanying figures.

It should be appreciated that the various aspects and embodiments of the detailed description as disclosed herein are illustrative of the specific ways to make and use the invention and do not limit the scope of invention when taken into consideration with the claims and the detailed description. It will also be appreciated that features from different aspects and embodiments of the invention may be combined with features from different aspects and embodiments of the invention.

Figure 1:
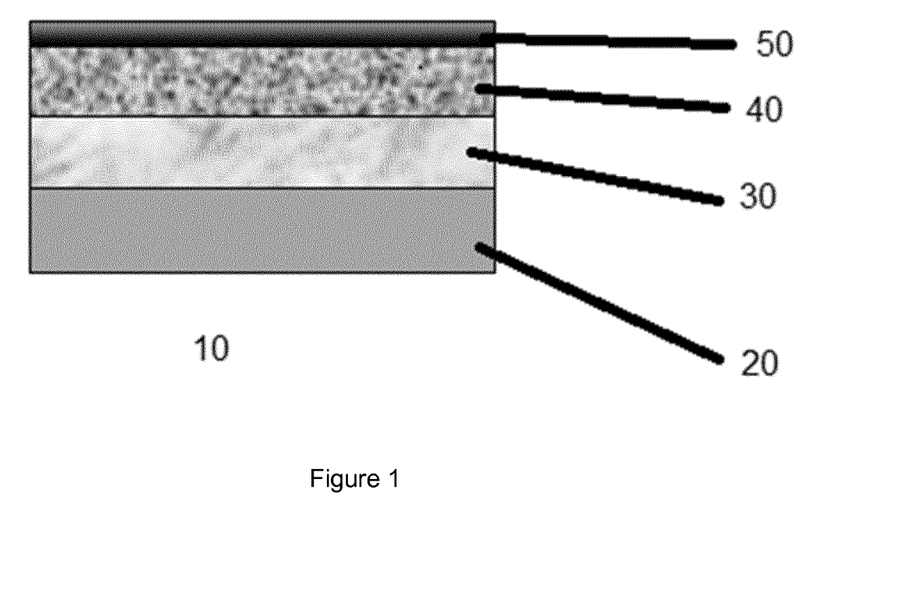
FIG. 1 shows a cross section of an electrode according to an aspect of the present invention.

In a first aspect the present invention relates to an electrode 10. The electrode 10 comprises:
   an electrode substrate 20,
   a layer of $TiO_x$ 30, 40 with a total thickness in the range of between 40-200 μm on at least one surface of the electrode substrate 20 wherein a porosity of the layer of $TiO_x$ 30, 40 is below 15%,
   an electro-catalytic layer 50 comprising oxides of ruthenium and cerium comprising at least 50 molar % ruthenium oxides on the layer of $TiO_x$ 30, 40 and wherein x is in the range 1-2 for the layer of $TiO_x$ 30, 40.

The term electrode substrate 20 as used herein refers to a core of the electrode 10.

The electrode substrate 20 is preferably titanium. Where the electrode substrate 20 is titanium it is preferable that the titanium is selected, according to the American Society of Testing Materials (ASTM) from one of:
   B313: 6-4 Titanium in Sheet, Strip and Plate
   5-2.5 Titanium in Sheet, Strip and Plate
   Commercially Pure Grade 1 Titanium in Sheet, Strip and Plate
   Commercially Pure Grade 2 Titanium in Sheet, Strip and Plate
   B314: Commercially Pure Grade 4 Titanium in Sheet, Strip and Plate
   Commercially Pure Grade 7 Titanium in Sheet, Strip and Plate
   B316: Commercially Pure Grade 11 Titanium in Sheet, Strip and Plate
   Commercially Pure Grade 12 Titanium in Sheet, Strip and Plate The electrode substrate 20 is preferably selected from commercially pure grade 1 or 2 as noted above.

The aforementioned types of electrode substrate 20 retain their physical and chemical integrity, also during manufacture of the electrode 10 and during its use, for e.g. in an electrolytic process.

A configuration of the electrode substrate 20 and therefore the resulting electrode 10 may be in the form of a flat sheet or plate, a curved surface, a convoluted surface, a punched plate, a woven wire screen, an expanded mesh sheet, a rod, or a tube. The electrode substrate 20 preferably has a configuration of a planar shape, in the form of the flat sheet, mesh or plate.

The layer of $TiO_x$ 30, 40 has total thickness in the range of between 40-200 μm and is present on at least one surface of the electrode substrate 20. A porosity of the layers of $TiO_x$ 30, 40 is below 15%.

The layer of $TiO_x$ 30, 40 can be a first layer of $TiO_x$ 30 and a second layer of $TiO_x$ 40. The first layer of $TiO_x$ 30 is present on at the least one surface of the electrode substrate 20 and the second layer of $TiO_x$ 40 is present on the first layer of $TiO_x$ 30 as shown in FIG. 1.

As noted the porosity of the layers of TiOx 30, 40 is below 15%. The first layer of $TiO_x$ 30 may have a porosity of below 5%, and more preferably in the range of between 0-4% and even more preferably in the range of between 0-3%.

The second layer of $TiO_x$ 40 may have a porosity of greater than 0 up to 15%. The second layer of $TiO_x$ 40 may have a porosity in the range 2-15%, more preferably in the range 3-9% and even more preferably in the range 3-7%.

Nevertheless it is to be appreciated that the layer of $TiO_x$ 30, 40 may have the same porosity and therefore it would be seen as one layer.

The layer of $TiO_x$ 30, 40 may further comprise an oxide of chromium.

The porosity of the layers of $TiO_x$ 30, 40 is indicative of the density and therefore a lower porosity means a denser layer and a higher porosity means a less dense layer.

A total thickness of the layer of $TiO_x$ 30, 40 is preferably in the range of between 70-160 µm. It is more preferable that the total thickness of the layer of $TiO_x$ 30, 40 is in the range of between 90-140 µm.

It is preferable that a thickness of the first layer of $TiO_x$ 30 is in the range of between 20-120 µm, preferably between 50-80 µm. It is preferable that a thickness of the second layer of $TiO_x$ 40 is in the range of between 20-120 µm, preferably between 50-80 µm.

The thickness of the layer of $TiO_x$ 30, 40 and their total thickness is determined according to a ASTM Designation F1854-98-Standard Test Method for Stereological Evaluation of Porous Coatings on Medical Implants.

x is between 1-2 for the layer of $TiO_x$ 30, 40. When x is between 1-2, an optimal balance between corrosion resistance and electrical conductivity is achieved in the electrode 10. It is preferable that x is between 1.6-1.9, for each or either layer of $TiO_x$ 30, 40. It is more preferable that x in the second layer of $TiO_x$ 40 is between 1.7-1.9. It is to be appreciated that value x can be readily determined by common general knowledge using various spectroscopic techniques.

The electro-catalytic layer 50 comprises oxides of ruthenium and cerium. The electro-catalytic layer 50 comprises at least 50 molar % ruthenium oxide. The electro-catalytic layer 50 is present on the layer of $TiO_x$ 30, 40.

The electro-catalytic layer 50 preferably provides a ruthenium content in an amount of between 2-25 $\mu m^{-2}$ on the layer of $TiO_x$ 30, 40. The electro-catalytic layer 50 more preferably provides a ruthenium content in an amount of between 10-15 $\mu m^{-2}$ on the layer of $TiO_x$ 30, 40.

In the electrode 10 it was found that the at least 95% of ruthenium of the electro-catalytic layer 50 penetrates the layer of $TiO_x$ 30, 40 to no more than 30% depth of a total thickness of the layer of $TiO_x$ 30, 40 to the electrode substrate 20. This is measured by SEM-EDX (Scanning electron microscopy with energy dispersive X-ray spectroscopy).

The electro-catalytic layer 50 preferably comprises ruthenium oxides in an amount of between 50-95 molar % and cerium in an amount of between 5-25 molar %.

The electro-catalytic layer 50 may also include any one of titanium, zirconium and lanthanum or any combination thereof. The titanium, zirconium and lanthanum or any combination thereof further increase a cathodic current efficiency in an electrolytic process, such as the manufacture of sodium chlorate (i.e. not to reduce hypochlorite). The presence of titanium was found to further prevent ruthenium dissolution from the electro-catalytic layer 50 into the bulk material (electrolyte) and stabilises the ruthenium structure in the electro-catalytic layer 50. This therefore further overcomes problems of reduced lifetime of the electrode 10.

Preferably a thickness of the electro-catalytic layer 50 is in the range of between 0.01-5 µm, preferably in the range of between 2-3 µm. The thickness of the electro-catalytic layer 50 is determined according to an ASTM Designation F1854-98-Standard Test Method for Stereological Evaluation of Porous Coatings on Medical Implants.

The porosity of the layer of $TiO_x$ 30, 40 is measured according to ISO/TR26946 (E)-Standard method for porosity measurement of thermally sprayed coatings as described below.

In this method the electrode 10 is cut into square specimens with sides of about 15 mm by means of a precision saw to form an electrode specimen. The electrode specimen is embedded with an epoxy resin (Struers Specifix-20) in a mounting cup with a diameter of 30 mm. The epoxy resin is cured at room temperature for about 8 hours and post-treated at 50° C. for 2 hours to improve resin hardness.

The mounted electrode specimen is ground by SiC paper with grit sizes of 180, 320, 800 and 1200 in turn for 2 minutes each turn, lubricated with water at a circling speed of 300 rpm using rotation with a force of 20N per stub (cylinder of mounted electrode). After the mounted electrode specimens are polished using water based diamond suspensions of 6, 3 and 1 µm grade (Struers DiaPro). Complementary rotation at a speed of 150 rpm for 6 minutes was used for each step. After polishing, the samples were cleaned with demineralised water, swabbed with lint-free tissue and allowed to air dry.

To determine the porosity by Secondary Electron Microscopy (SEM), the polished electrode specimen was adhered to an aluminium stub using double sided conductive tape. To facilitate charge drainage, an electric connection from the top to the stub was made using conductive tape. In order to prevent charging in the SEM, a thin carbon coating was applied using a Balzers MED 010 sputter coater. SEM images were recorded on a Zeiss LEO 1550 FE-SEM, equipped with an Oxford PentaFET-3x detector. Backscattered electron mode was used at a work distance of ~5.5 mm, using a quadruple backscattered electron detector. The primary electron energy was 10 keV. A minimum of 5 random areas (all above 0.12 $mm^2$) per electrode specimen were imaged. Three batches of electrode specimen were polished at different times giving a minimum of 15 images for each porosity level.

A quantitative assessment of the porosity is carried out by image analysis on the basis that for random distributed pores the surface fraction is equal to volumetric fraction of pores.

The images were analysed using ImageJ software. The images were cropped to a rectangular shape that excludes the interface between the mounting resin and the first 30 and second layer 40 of $TiO_x$ and between the first 30 and second layer 40 of $TiO_x$ and the electrode substrate 20. Images were then binarised using the "default" automatic threshold algorithm provided by ImageJ (http://fiji.sc/wiki/index.php/Auto_Threshold). The noise was then removed by means of a despeckle filter. The area fraction represents the porosity by volume.

The electrode 10 may be part of a bipolar electrode that is to say that the electrode 10 functions as an anode of one cell and a cathode of another cell. When the electrode 10 is bipolar electrode, the cathode side is according to the present invention and the anode side is according to an electrode known in the art, depending on the final application. When used as a bipolar electrode, the electrode 10 provides a more compact cell system which circumvents a need for backplates in the cell. Furthermore the electrode 10 when used as a bipolar electrode can be easily replaced if need be.

The electrode 10 is preferably a cathode.

In a further aspect of the present invention, the electrode 10 is used as a cathode in an electrolytic process. The electrolytic process can be a process where hydrogen gas is manufactured at the cathode.

The electrode 10 may be used in an electrolytic cell for a reduction of water-based electrolytes to hydrogen and hydroxide ions. The electrode 10 may be used in an electrolytic cell for treatment of water. The electrolytic process can be the manufacture of alkali metal chlorate.

In the manufacture of alkali metal chlorate, the electrode 10 can be installed into a chlorate cell as a cathode. As an anode an electrode known in the art can be used. An electrolyte with a composition of 580±50 gL$^{-1}$ NaClO$_3$, 120±20 gL$^{-1}$ NaCl and 4±3 gL$^{-1}$ Na$_2$Cr$_2$O$_7$*2H$_2$O all of which were dissolved in deionized water is used. The electrolyte in the electrolytic process can be maintained at a temperature of approximately 70±20° C.

The chlorate cell can be polarised to a current density of between 0.8-5 kA/m$^2$, and more preferably to a current density of between 2-3 kA/m$^2$.

In a further aspect the present invention relates to a process of manufacturing an electrode 10. It is to be appreciated that the process of manufacturing the electrode 10, relates to the electrode 10 as previously described. The process of manufacturing the electrode 10 comprises the steps:
  i) providing an electrode substrate 20,
  ii) coating at least one surface of the electrode substrate 10 by plasma spraying to form a layer of TiO$_x$ 30, 40 with a total thickness in the range of between 40-200 μm on at least one surface of the electrode substrate 20 to provide a porosity of the layer of TiO$_x$ 30, 40 of below 15%,
  iii) forming an electro-catalytic layer 50 comprising oxides of ruthenium and cerium comprising at least 50 molar % ruthenium oxides on the layer of TiO$_x$ 30, 40 and wherein x is in the range 1-2 for the layer of TiO$_x$ 30, 40.

The electrode substrate 20 is provided by any one of those as previously mentioned.

The electrode substrate 20 may be pre-treated by a cleaning procedure and/or a roughening procedure and/or a pickling procedure or any combination thereof prior to the coating step (ii).

The cleaning procedure is used to remove impurities present on a surface of the electrode substrate 20. The impurities may adversely affect adhesion of the first layer 30 of TiO$_x$ to the at least one surface of the electrode substrate 20. The impurities include stains, such as oils and fats; cutting wastes; and salts. The cleaning procedure includes any one of alcohol washing, alkaline washing, acid washing, ultrasonic cleaning, steam cleaning and scrubbing cleaning or any combination thereof. The cleaning procedure further includes washing of the electrode substrate with water and drying.

The roughening procedure is used to roughen a surface of the electrode substrate 20. The roughening procedure includes any one of machining the electrode substrate 20, blasting the electrode substrate 20 with particulates or laser etching or any combination thereof. It is preferable that the roughening procedure is blasting the electrode substrate 20 with particulates. As the surface of the electrode substrate 20 is roughened, a surface area of the electrode substrate 20 increases. The increase in the surface area of the electrode substrate 20 provides a means for mechanical interlocking for the first layer 30 of TiO$_x$ when coated on at least one surface of the electrode substrate 20 and improves its mechanical adhesion.

The particulates include sand, grit, and aluminium oxide or any combination thereof. It is preferable that the particulates are selected from aluminium oxide. It is preferable that the particulates have an average particle size of between 50-300 μm. The particulates are blasted at the electrode substrate 20 to roughen the surface of the electrode substrate 20. The particulates are blasted at the electrode substrate 20 with a pressure of between 1.5-5 bar and can be directed to the surface of the electrode substrate 20 at an angle of between 45-60°. Following blasting the electrode substrate 20 with particulates, the electrode substrate 20 may be cleaned as mentioned above and may be subjected to compressed air to remove any remaining particulates.

It is preferable that the roughening procedure is done by a robotically controlled movement during the machining, blasting, or laser etching over the electrode substrate 20.

It is preferable that the roughening procedure is used to roughen a surface of the electrode substrate 20 to provide a R$_a$ value in the range of between 1-6 μm, preferably in the range of between 1-5 μm and most preferably in the range of between 2-4 μm. The R$_a$ value is measured according to SS-EN ISO 4287:1998.

The pickling procedure is a process in which the electrode substrate 20 is treated in acid at a temperature in the range of between 60-90° C. The acid can be selected from one of hydrochloric acid, nitric acid, sulphuric acid and phosphoric acid. The acid is an aqueous acid with between 10-50 wt % acid. The electrode substrate 20 can be treated in the aqueous acid for a time of up to 8 hours. Where the electrode substrate 20 is roughened, the pickling procedure may not be preferred, this is because the pickling procedure smoothens away the roughness, which may comprise an ability of the first layer 30 of TiO$_x$ to adhere to the at least one surface of the electrode substrate 20 during the plasma spraying process.

Coating at least one surface of the electrode substrate 20 by plasma spraying to form the first layer 30 of TiO$_x$ and coating by plasma spraying on the first layer 30 of TiO$_x$ to form the second layer 40 of TiO$_x$ is achieved by plasma spraying a powder of TiO$_x$ to form the respective layer of TiO$_x$ 30, 40.

The powder of TiO$_{1.9}$ may be provided by Oerlikon Metco (Metco 102). The powder of TiO$_{1.7}$ may be provided by Oerlikon Metco (Metco 6231A). The powder of TiO$_{1.8}$ may be provided by Oerlikon Metco (Metco 6232B). The powder of TiO$_{1.9}$ may be provided by Oerlikon Metco (Metco 6233C). The powder of TiO$_2$ which contains 45 wt. % Cr$_2$O$_3$ may be provided by Oerlikon Metco (Metco 111).

An example of plasma spraying is described in U.S. Pat. No. 4,140,813. Plasma spraying may be achieved using a Triplex II plasma spraying system by Oerlikon Metco, a TriplexPro-200 plasma spraying system by Oerlikon Metco or a F4 plasma spraying system by Oerlikon Metco.

Plasma spraying is advantageous in that it allows the creation of uniform layers of TiO$_x$ 30, 40. Plasma spraying is advantageous in that it allows the creation of layers of TiO$_x$ 30, 40 with the desired thickness easily. Plasma spraying is advantageous in that it allows the creation of layers of TiO$_x$ 30, 40 with the desired porosity by altering parameter settings of the plasma spray gun process such as speed, energy, temperature and gas composition.

It is preferable that a speed at which the powder of TiO$_x$ is applied is in the range of between 30-670 ms$^{-1}$ during the plasma spray gun process. It is preferable that the speed at which the powder of TiO$_x$ is applied is in the range of between 300-670 ms$^{-1}$ as this ensures that as the powder of TiO$_x$ hits the electrode substrate 20, the powder deforms, thus minimising the amounts of voids in the layers 30 and 40 of TiO$_x$.

It is preferable that a temperature during the plasma spray gun process is in the range of between 1000-3500° C.

It is preferable that the energy during the plasma spray gun process is in the range of between 300-600 Amps.

The gas composition is at least one of helium, hydrogen, nitrogen or argon or any combination thereof.

The gas composition preferably comprises at least one of argon or nitrogen as these gases are advantageous for the flow and particle entrainment during the plasma spraying process. The gas composition preferably also comprises in addition to at least one of argon or nitrogen, at least one of hydrogen and helium as these gases are advantageous for heat transfer during the plasma spraying process.

In order to achieve the layer of $TiO_x$ 30, 40 with the desired porosity, the important parameters (gas composition and amperage) can be according to table 1.

TABLE 1

Parameter setting of plasma gun spray parameters

| | Porosity target value of $TiO_x$ layer type | | |
|---|---|---|---|
| | c.a. 0-5% | c.a. 3-10% | c.a. 8-25% |
| Ar [nlpm] | 25-50 | 35-55 | 35-50 |
| $N_2$ [nlpm] | 0 | 0-6 | 0-6 |
| He [nlpm] | 0-25 | 0 | 0 |
| Amperage [A] | 500 ± 75 | 450 ± 75 | 425 ± 75 |

Further adjustment of the porosity is preferably carried out by adjusting the amperage.

It is preferable that the gas is applied with a flow rate in the range of between 0-80 nlpm (normal litres per minute).

Once the aforementioned parameters have been stabilised for the plasma spray gun process, the powder of $TiO_x$ is plasma sprayed on the electrode substrate 20 to form the coating on at least one surface of the electrode substrate 20 to form the first layer of $TiO_x$ 30.

The powder of $TiO_x$ is plasma sprayed on the electrode substrate 20 preferably in a direction perpendicular to the electrode substrate 20 where the electrode substrate 20 is flat. However when the powder of $TiO_x$ is plasma sprayed on edges of the electrode substrate 20 it is preferable that the powder of $TiO_x$ is plasma sprayed on the electrode substrate 20 preferably at an angle of 45° to the electrode substrate 20 to ensure uniform coverage to the electrode substrate 20.

The powder of $TiO_x$ is plasma sprayed on the electrode substrate 20 at a distance of 175 mm±50 mm from a tip of a plasma spray gun to the electrode substrate 20 and more preferably at a distance of 150 mm.

To achieve the first layer of $TiO_x$ 30 of $TiO_x$ the plasma spraying process can be repeated in a stepwise procedure. By repeating the plasma spraying process it has been found that this provides better control in forming the layer and has the advantage of filling in defects (e.g. cracks) in the previously applied layer. By repeating the plasma spraying process the desired thickness of the first layer of $TiO_x$ 30 can be achieved in a stepwise manner.

To achieve the second layer of $TiO_x$ 40 of $TiO_x$ the plasma spraying process can be repeated in a stepwise procedure. By repeating the plasma spraying process it has been found that this provides better control in forming the layer and has the advantage of filling in defects (e.g. cracks) in the previously applied layer. By repeating the plasma spraying process the desired thickness of the second layer of $TiO_x$ 40 can be achieved in a stepwise manner.

It is preferable that the powder of $TiO_x$ is plasma sprayed by a robot controlled movement over the electrode substrate 20.

During the coating procedure, the electrode substrate 20 may be rotated so more surfaces are coated to form the first layer of $TiO_x$ 30.

Once the first layer of $TiO_x$ 30 has been formed on the electrode substrate 20, the parameter settings of the plasma spray gun process are accordingly altered and the coating procedure as described above is repeated to form the second layer of $TiO_x$ 40 of $TiO_x$ on the first layer of $TiO_x$ 30.

The electro-catalytic layer 50 is then coated on the layer of $TiO_x$ 30, 40.

Before application of the electro-catalytic layer 50 on the second layer 40, it is preferable that the surface of the second layer 40 has a surface roughness $R_a$ value in the range of between 2-20 μm, more preferably in the range of between 5-15 μm. The surface roughness may be achieved as a result of the plasma spraying process. The surface roughness may be achieved by the roughening procedure as previously described. The $R_a$ value is measured according to SS-EN ISO 4287:1998. It has been found that having a surface roughness in the aforementioned ranges as well as the porosity of the layer of $TiO_x$ 30, 40 provides an ability to form a good chemical bond between the electro-catalytic layer 50 and the layer of $TiO_x$ 30, 40.

The electro-catalytic layer 50 can be coated on the layer of $TiO_x$ 30, 40 by any one of a thermal spray method, a thermal decomposition method, a sol-gel method, a paste method, an electrophoresis method, a physical vapour deposition (PVD) method and an atomic layer deposition (ALD) method.

It is preferable that the electro-catalytic layer 50 is coated on layer of $TiO_x$ 30, 40 by the thermal decomposition method according to the following procedure.

A solution or suspension of the electro-catalytic layer compounds is applied on a surface of the layer $TiO_x$ 30, 40 heated to dry and then a thermolysis is performed. This process is repeated, as required to achieve the desired loading of the electro-catalytic layer 50.

It is preferable that the solution or suspension of the electro-catalytic layer compounds comprises an acid. The acid is preferably a mineral acid such as hydrochloric acid. The solvent used for the formation of the solution or suspension of the electro-catalytic layer compounds can be an aqueous solvent which may comprise at least one alcohol. The alcohol is selected from one of methanol, ethanol, 1-propanol, 2-propanol, 1-butanol, 2-butanol, 1-pentanol, 2-pentanol and 3-methyl-2-butanol or any combination thereof. Where the solvent is an aqueous solvent which comprises at least one alcohol, it is preferable that the solvent comprises at least 50 volume % alcohol. It is preferable that the solvent is 1-butanol and/or water as this solvent mixture optimises a wetting of the layer of $TiO_x$ 30, 40.

The electro-catalytic layer compounds, which are provided to the solution or suspension, can be a salt and/or an acid of the resultant electro-catalytic layer 50, for example, chlorides, nitrides, nitrites nitrates, iodides, bromides, sulphates, borates, carbonates, acetates, and citrates or any combination thereof of ruthenium and cerium.

Once the solution or suspension of the electro-catalytic layer compounds is applied on the layer of $TiO_x$ 30, 40, the solution or suspension is heated (5-15 mins at a temperature of between 70-100° C.) to dry and then the thermolysis (10-15 mins at a temperature of between 450-550° C.) performed. During the thermolysis, the electro-catalytic layer compounds form the electro-catalytic layer 50 on the layer of $TiO_x$ 30, 40. The thermolysis causes a conversion of the electro-catalytic layer compounds to metals and/or the oxides thereof.

As noted the electro-catalytic layer 50 comprises oxides of ruthenium and cerium. The electro-catalytic layer 50 comprises at least 50 molar % ruthenium oxides. The electro-catalytic layer 50 is present on the layer of $TiO_x$ 30, 40.

The electro-catalytic layer 50 preferably provides a ruthenium content in an amount of between 2-25 $gm^{-2}$ on the layer of $TiO_x$ 30, 40. The electro-catalytic layer 50 more preferably provides a ruthenium content in an amount of between 10-15 $gm^{-2}$ on the layer of $TiO_x$ 30, 40.

It is to be appreciated that the invention also relates to an electrode obtainable by the process as described herein.

The present invention is demonstrated by the following non-limiting examples.

EXAMPLES

1. Comparative Example

An electrode substrate (titanium, ASTM, B313, Grade 1) was degreased and cleaned using alcohol.

The electrode substrate was roughened with aluminium oxide particulates (WSK 70, 150-300 μm). The aluminium oxide particulates were directed on a surface of the electrode substrate at an angle of between 45-60° to the vertical line of the electrode substrate with a pressure of 3 bar. The roughening procedure provided a $R_a$ value 3 μm.

The roughened electrode substrate was subjected to compressed air to remove loose particulates of aluminium oxide.

A Triplex Pro gun (Oerlikon Metco) was used during the plasma spraying process. A powder of $TiO_x$ (x value of 1.7) by Oerlikon Metco (Metco 6231A) was used. The powder was applied in a direction perpendicular to the roughened electrode substrate. The parameters used during the plasma spraying process to form layers of $TiO_x$ with various porosities on the electrode substrate are shown in table 2.

TABLE 2

| | Parameters used | | | | Layers of $TiO_x$ Measured | |
|---|---|---|---|---|---|---|
| | Ar [nlpm] | $N_2$ [nlpm] | He [nlpm] | Amperage [A] | porosity [%] | Thickness [μm] |
| First layer of $TiO_x$ | 25-45 | 0 | 20-40 | 475 ± 75 | 2-4 | 50-70 |
| Second layer of $TiO_x$ | 50-70 | 1-5 | 0 | 400 ± 50 | 5-7 | 30-50 |

A total thickness of the first and second layer of $TiO_x$ was approximately 100 μm. A catalyst solution ($RuCl_3$ dissolved in HCl acidified 1-butanol) was applied onto the second layer of $TiO_x$ using an electrostatic spray. The applied catalyst solution was heated for 5 min at 80° C., then thermolysed for about 12 min at 470° C. The process was repeated until a ruthenium loading of about 14 $gm^{-2}$ was achieved.

Figure 2A:
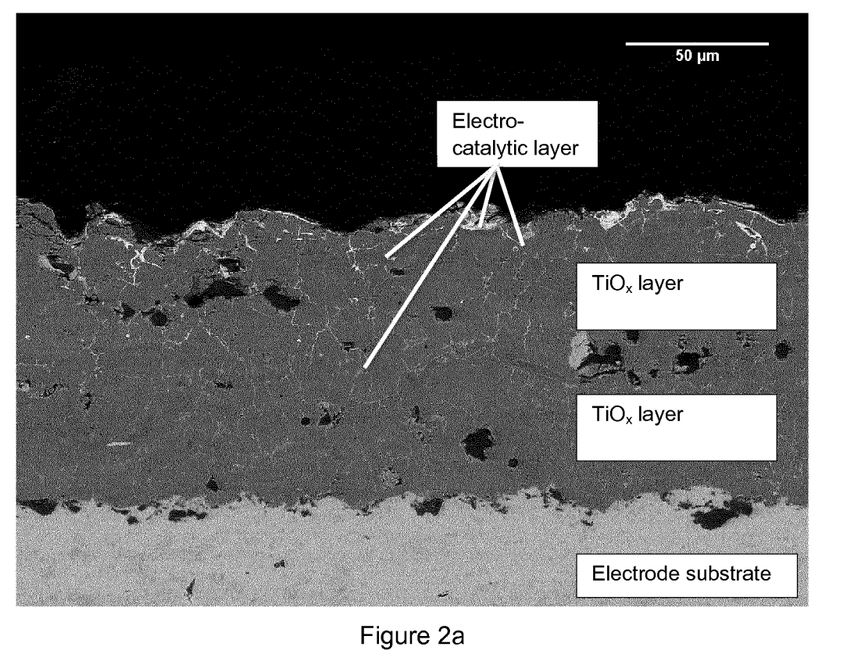
FIG. 2a shows a cross section of an electrode according to a comparative example of the present invention.

A cross section of the electrode acquired with scanning electron microscope (SEM) in backscattered detection mode is shown in FIG. 2a. As seen in FIG. 2a a substantial amount of the electro-catalytic layer (white) percolates within the $TiO_x$ layer.

The electrode (as a cathode) was installed into a chlorate cell. As an anode a PSC120 electrode was used. The electrolyte had a composition of 580±20 $gL^{-1}$ $NaClO_3$, 120±10 $gL^{-1}$ NaCl and 5±2 $gL^{-1}$ $Na_2Cr_2O_7*2H_2O$ all of which were dissolved in deionized water. A temperature was maintained at 80±2° C.

The chlorate cell was polarised to a current density of 3 $kA/m^2$.

Figure 2B:
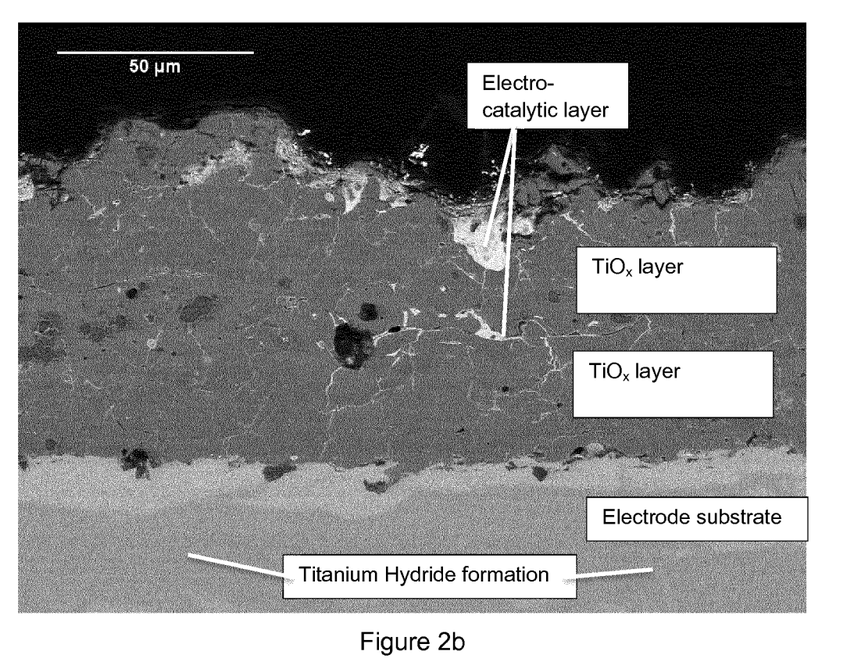
FIG. 2b shows a cross section of an electrode according to a comparative example of the present invention, after being used in an electrolytic process.

The chlorate cell was run for a period of 5 months period with a few stops. After this period the electrode (as a cathode) was removed and inspected. A cross section of the electrode acquired with a scanning electron microscope (SEM) in backscattered detection mode is shown in FIG. 2b. As can be seen from FIG. 2b, a band with a darker shade of grey appears in the substrate adjacent to the $TiO_x$ layer, which is indicative of the formation of titanium hydride due to hydrogen diffusion to the electrode substrate. The presence of titanium hydrides in the substrate was confirmed by using SEM-EBSD (Electron Back Scatter Diffraction) in combination with SEM-EDX (energy dispersive X-ray spectroscopy). Furthermore the change in morphology of the electrode substrate as seen indicates that hydrogen has permeated through the $TiO_x$ layers to form a titanium hydride. Furthermore the electro-catalytic compound layer (white) percolates more substantially within the $TiO_x$ layer.

2. Example According to Present Invention

An electrode substrate was degreased, cleaned and roughened to provide a $R_a$ value of 3 μm as example 1.

The roughened electrode substrate was subjected to compressed air to remove loose particulates of aluminium oxide.

A Triplex Pro gun (Oerlikon Metco) was used during the plasma spraying process. A powder of $TiO_x$ (x value of 1.7) by Oerlikon Metco (Metco 6231A) was used. The powder was applied in a direction perpendicular to the roughened electrode substrate. The parameters used during the plasma spraying process to form layers of $TiO_x$ with various porosities on the electrode substrate are shown in table 3.

TABLE 3

| | Parameters used | | | | Layers of $TiO_x$ Measured | |
|---|---|---|---|---|---|---|
| | Ar [nlpm] | $N_2$ [nlpm] | He [nlpm] | Amperage [A] | porosity [%] | Thickness [μm] |
| First layer of $TiO_x$ | 25-50 | 0 | 0-25 | 500 ± 75 | 3-5 | 45-65 |
| Second layer of $TiO_x$ | 35-55 | 0-6 | 0 | 425 ± 75 | 17-21 | 75-95 |

A total thickness of the first and second layer of $TiO_x$ was approximately 140 μm.

A catalyst solution ($RuCl_3$ and $CeCl_3$—75 molar % Ru and 25 molar % Ce—dissolved in HCl acidified water:1-butanol, 3:7) was applied onto the second layer of $TiO_x$ using an electrostatic spray. The applied catalyst solution was heated for 8 min at 80° C., then thermolysed for about 12 min at 470° C. The process was repeated until a ruthenium loading of about 14 $gm^{-2}$ was achieved.

Figure 3A:
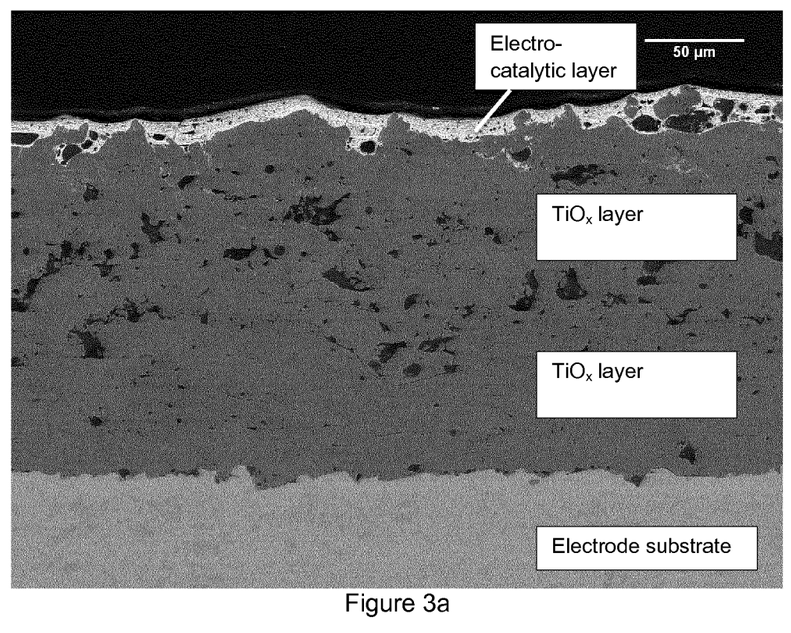
FIG. 3a shows a cross section of an electrode according to an aspect of the present invention.

A cross section of the electrode acquired with scanning electron microscope (SEM) in backscattered detection mode is shown in FIG. 3a. It is seen that the electro-catalytic layer (white) is more localised at a surface of the layer of $TiO_x$.

The electrode (as a cathode) was installed into a chlorate cell and operated as example 1.

Figure 3B:
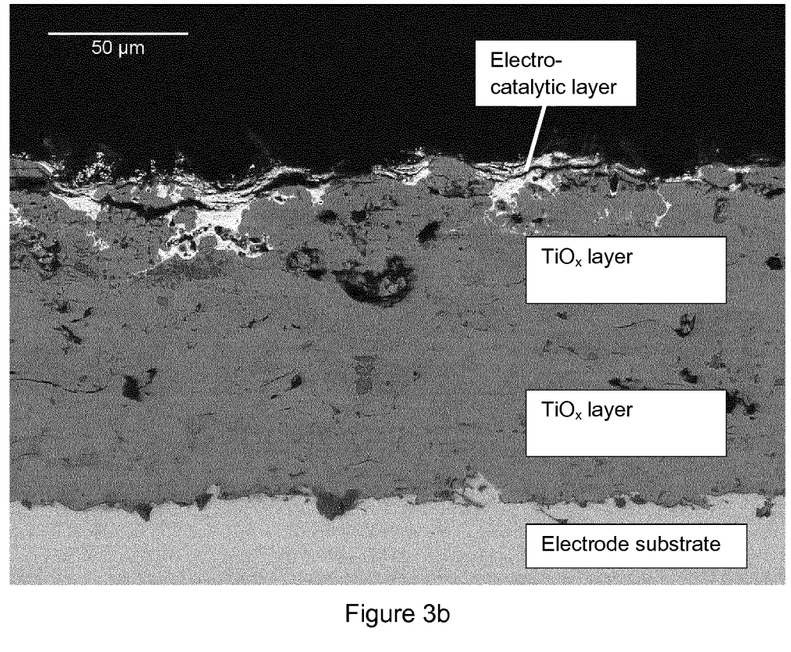
FIG. 3b shows a cross section of an electrode according to an aspect of the present invention, after being used in an electrolytic process.

After this period the electrode (as a cathode) was removed and inspected. A cross section of the electrode acquired with a scanning electron microscope (SEM) in backscattered detection mode is shown in FIG. 3b. As can be seen from FIG. 3b, no titanium hydride formation was detected indicating that no penetration of hydrogen (H2 and/or atomic hydrogen) to the electrode substrate had occurred. No changes in morphology of the electrode substrate as seen in example 1 were noted. Furthermore there appeared to be less delocalization of the electro-catalytic layer (white) within the layer of $TiO_x$ as compared to examples 1.

3. Example According to Present Invention

An electrode substrate was degreased, cleaned and roughened to provide a $R_a$ value of 3 μm as example 1.

The roughened electrode substrate was subjected to compressed air to remove loose particulates of aluminium oxide.

A Triplex Pro gun (Oerlikon Metco) was used during the plasma spraying process. A powder of $TiO_x$ (x value of 1.7) by Oerlikon Metco (Metco 6231A) was used to form a first layer of $TiO_x$. The powder was applied in a direction perpendicular to the roughened electrode substrate. On top of this a second layer was formed made up of $TiO_x$ and 45 wt. % oxides of chromium by Metco (Metco 111). The powder was applied in a direction perpendicular to the roughened electrode substrate.

The parameters used during the plasma spraying process to form the layers with various porosities on the electrode substrate are shown in table 4.

TABLE 4

| | Parameters used | | | | Layers of $TiO_x$ | |
| --- | --- | --- | --- | --- | --- | --- |
| | Ar [nlpm] | $N_2$ [nlpm] | He [nlpm] | Amperage [A] | Measured porosity [%] | Thickness [μm] |
| First layer of $TiO_x$ | 25-50 | 0 | 0-25 | 500 ± 75 | 3-5 | 40-60 |
| Second layer of $TiO_x$ and 45 wt. % oxide of chromium | 35-55 | 0-6 | 0 | 425 ± 75 | 10-12 | 80-100 |

A total thickness of the first and second layer of $TiO_x$ was approximately 140 μm.

A catalyst solution ($RuCl_3$ and $CeCl_3$—75 molar % Ru and 25 molar % Ce—dissolved in HCl acidified water:1-butanol, 3:7) was applied onto the second layer using an electrostatic spray. The applied catalyst solution was heated for 8 min at 80° C., then thermolysed for about 12 min at 470° C. The process was repeated until a ruthenium loading of about 14 $gm^{-2}$ was achieved.

Figure 4A:
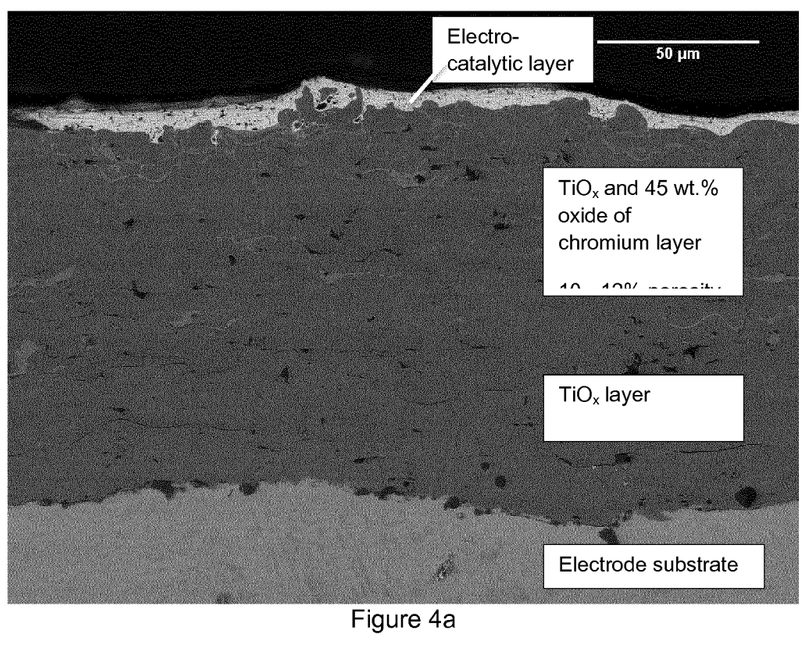
FIG. 4a shows a cross section of an electrode according to an aspect of the present invention.

A cross section of the electrode acquired with—scanning electron microscope (SEM) in backscattered detection mode is shown in FIG. 4a. It is seen that the electro-catalytic layer (white) is almost entirely localised at a surface of the layer of $TiO_x$.

The electrode (as a cathode) was installed into a chlorate cell and operated as example 1.

Figure 4B:
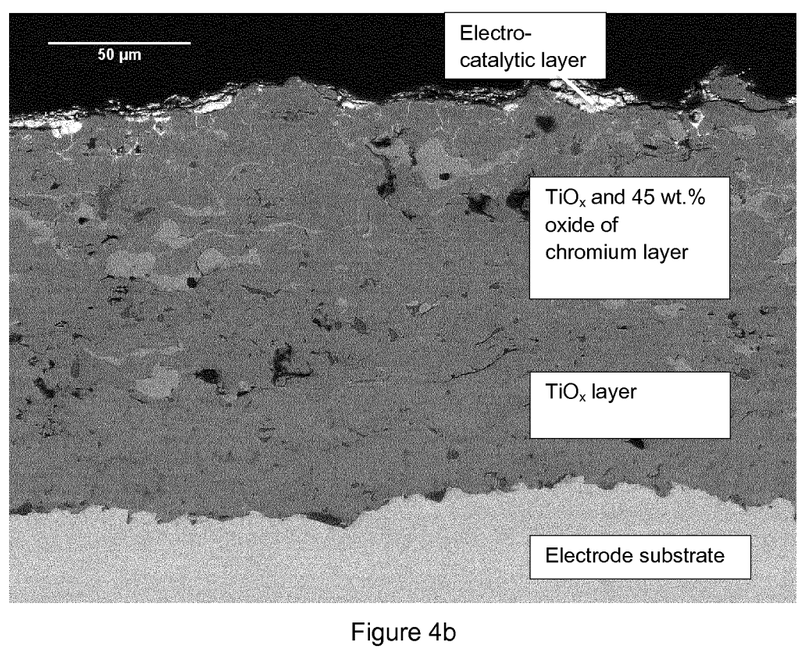
FIG. 4b shows a cross section of an electrode according to an aspect of the present invention, after being used in an electrolytic process.

After this period the electrode (as a cathode) was removed and inspected. A cross section of the electrode acquired with scanning electron microscope (SEM) in backscattered detection mode is shown in FIG. 4b. As can be seen from FIG. 4b, no titanium hydride formation was detected indicating that no penetration of hydrogen ($H_2$ and/or atomic hydrogen) to the electrode substrate had occurred. The electro-catalytic layer (white) remains almost entirely localised at a surface of the layer of $TiO_x$.

During the 5 month period the electrode (as a cathode) maintained its cathodic efficiency, i.e. the production of hydrogen gas remained constant. Furthermore the electrode (as a cathode) maintained its potential in that no significant extra voltage was needed when a constant current was applied to maintain the electrolysis process.

4. Example According to Present Invention

An electrode substrate was degreased, cleaned and roughened to provide a $R_a$ value of 3 μm as example 1.

The roughened electrode substrate was subjected to compressed air to remove loose particulates of aluminium oxide.

The same plasma spraying conditions as example 2 were used.

A total thickness of the first and second layer of $TiO_x$ was approximately 140 μm.

A catalyst solution ($RuCl_3$ and $CeCl_3$—90 molar % Ru and 10 molar % Ce—dissolved in HCl acidified water) was applied onto the second layer of $TiO_x$ using a brush. The applied catalyst solution was heated for 15 min at 90° C., then thermolysed for about 10 min at 530° C. The process was repeated until a ruthenium loading of about 14 $gm^{-2}$ was achieved.

Figure 5:
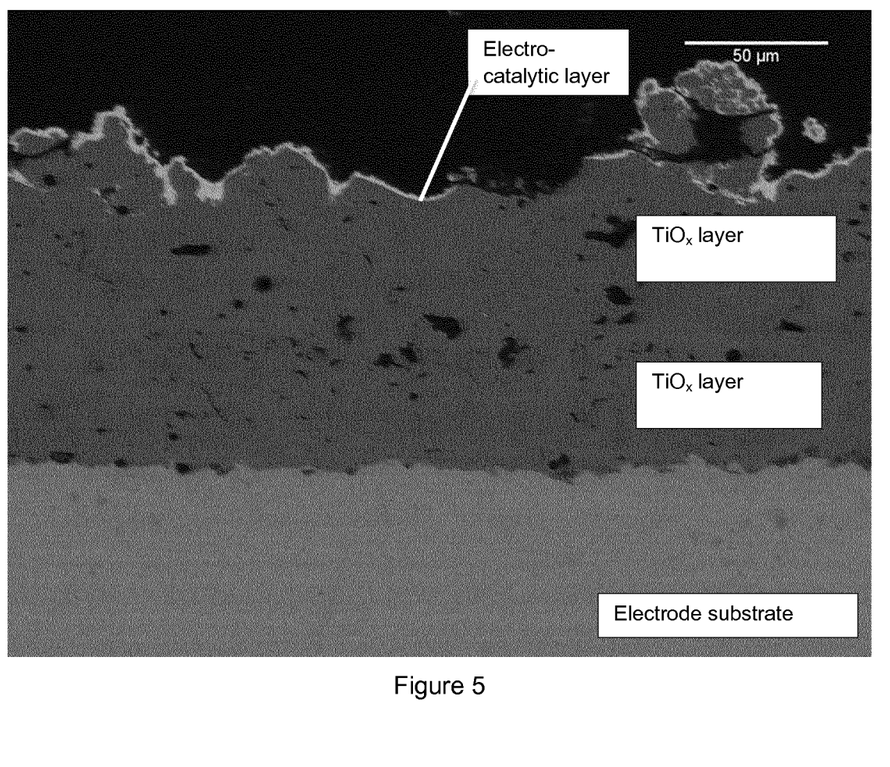
FIG. 5 shows a cross section of an electrode according to an aspect of the present invention.

A cross section of the electrode acquired with scanning electron microscope (SEM) in backscattered detection mode is shown in FIG. 5. As can be seen in FIG. 5 almost all the catalyst is localized on the surface of the layer of $TiO_x$. This example demonstrates that it is possible to get the electro-catalytic layer on the layer of $TiO_x$ even when the Ru-concentration and the molar ratio between Ce/Ru is low. This is achieved by increasing calcination temp to 530° C.

5. Example According to Present Invention

An electrode substrate was degreased, cleaned and roughened to provide a $R_a$ value of 3 μm as example 1.

The roughened electrode substrate was subjected to compressed air to remove loose particulates of aluminium oxide.

A Triplex Pro gun (Oerlikon Metco) was used during the plasma spraying process. A powder of $TiO_x$ (x value of 1.7) by Oerlikon Metco (Metco 6231A) was used. The powder was applied in a direction perpendicular to the roughened electrode substrate. The parameters used during the plasma spraying process to form layers of $TiO_x$ with various porosities on the electrode substrate are shown in table 5.

TABLE 5

| | Parameters used | | | | Layers of $TiO_x$ | |
| --- | --- | --- | --- | --- | --- | --- |
| | Ar [nlpm] | $N_2$ [nlpm] | He [nlpm] | Amperage [A] | Measured porosity [%] | Thickness [μm] |
| First layer of $TiO_x$ | 25-50 | 0 | 0-25 | 500 ± 75 | 3-5 | 40-60 |
| Second layer of $TiO_x$ | 35-55 | 0-6 | 0 | 450 ± 75 | 6-8 | 50-70 |

A total thickness of the first and second layer of $TiO_x$ was approximately 110 µm.

A catalyst solution ($RuCl_3$ and $CeCl_3$—75 molar % Ru and 25 molar % Ce—dissolved in HCl acidified water:1-butanol, 3:7) was applied onto the second layer using an electrostatic spray. The applied catalyst solution was heated for 8 min at 80° C., then thermolysed for about 12 min at 470° C. The process was repeated until a ruthenium loading of about 14 $gm^{-2}$ was achieved.

The electrode (as a cathode) was installed into a chlorate cell and operated as example 1, but the chlorate cell was polarised to a current density of 2.3 $kA/m^2$.

Figure 6:
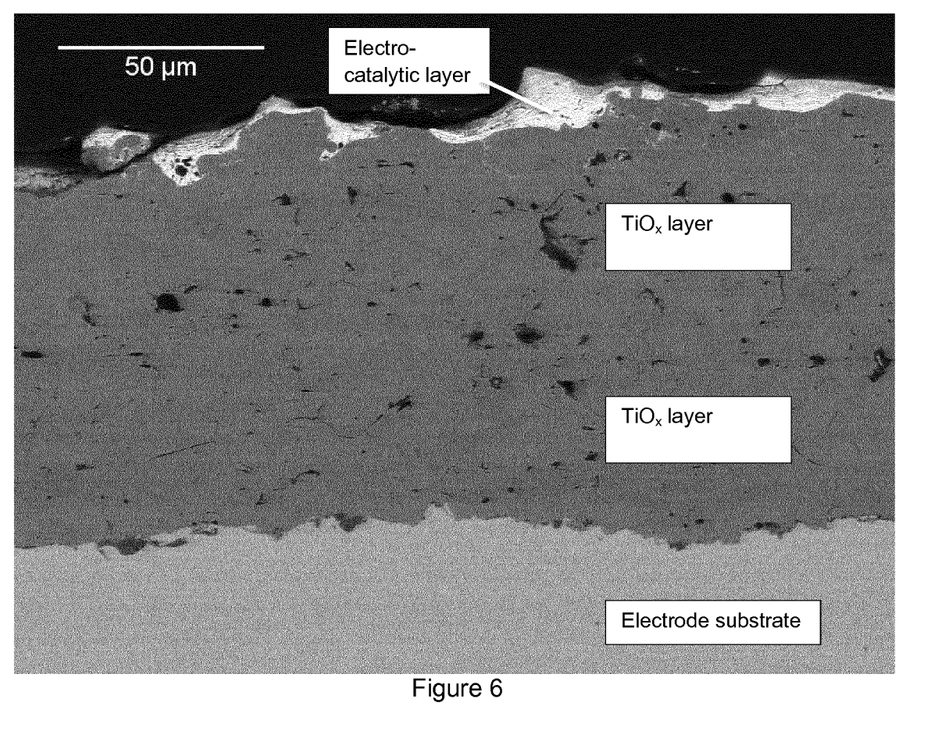
FIG. 6 shows a cross section of an electrode according to an aspect of the present invention, after being used in an electrolytic process.

After this period the electrode (as a cathode) was removed and inspected. A cross section of the electrode acquired with scanning electron microscope (SEM) in backscattered detection mode is shown in FIG. 6. As can be seen from FIG. 6, no titanium hydride formation was detected indicating that no penetration of hydrogen (H2 and/or atomic hydrogen) to the electrode substrate had occurred when the layers of $TiO_x$ have similar porosity, a first layer is slightly less porous than a second layer. No delocalization of the electro-catalytic layer (white) within the layer of $TiO_x$ was observed.

During the 5 month period the electrode (as a cathode) maintained its cathodic efficiency, i.e. the production of hydrogen gas remained constant. Furthermore the electrode (as a cathode) maintained its potential in that no significant extra voltage was needed when a constant current was applied to maintain the electrolysis process.

6. Example According to Present Invention

An electrode substrate was degreased, cleaned and roughened to provide a $R_a$ value of 3 µm as example 1.

The roughened electrode substrate was subjected to compressed air to remove loose particulates of aluminium oxide.

A Triplex Pro gun (Oerlikon Metco) was used during the plasma spraying process. A powder of $TiO_x$ (x value of 1.7) by Oerlikon Metco (Metco 6231A) was used. The powder was applied in a direction perpendicular to the roughened electrode substrate. The parameters used during the plasma spraying process to form layers of $TiO_x$ with various porosities on the electrode substrate are shown in table 6.

TABLE 6

| | Parameters used | | | | Layers of $TiO_x$ Measured | |
|---|---|---|---|---|---|---|
| | Ar [nlpm] | $N_2$ [nlpm] | He [nlpm] | Amperage [A] | porosity [%] | Thickness [µm] |
| First layer of $TiO_x$ | 25-50 | 0 | 0-25 | 500 ± 75 | 3-5 | 35-55 |
| Second layer of $TiO_x$ | 25-50 | 0 | 0-25 | 500 ± 75 | 3-5 | 35-55 |

A total thickness of the first and second layer of $TiO_x$ was approximately 90 µm.

A catalyst solution ($RuCl_3$ and $CeCl_3$—75 molar % Ru and 25 molar % Ce—dissolved in HCl acidified water:1-butanol, 3:7) was applied onto the second layer using an electrostatic spray. The applied catalyst solution was heated for 8 min at 80° C., then thermolysed for about 12 min at 470° C. The process was repeated until a ruthenium loading of about 14 $gm^{-2}$ was achieved.

The electrode (as a cathode) was installed into a chlorate cell and operated as example 1, but the chlorate cell was polarised to a current density of 2.3 $kA/m^2$.

Figure 7:
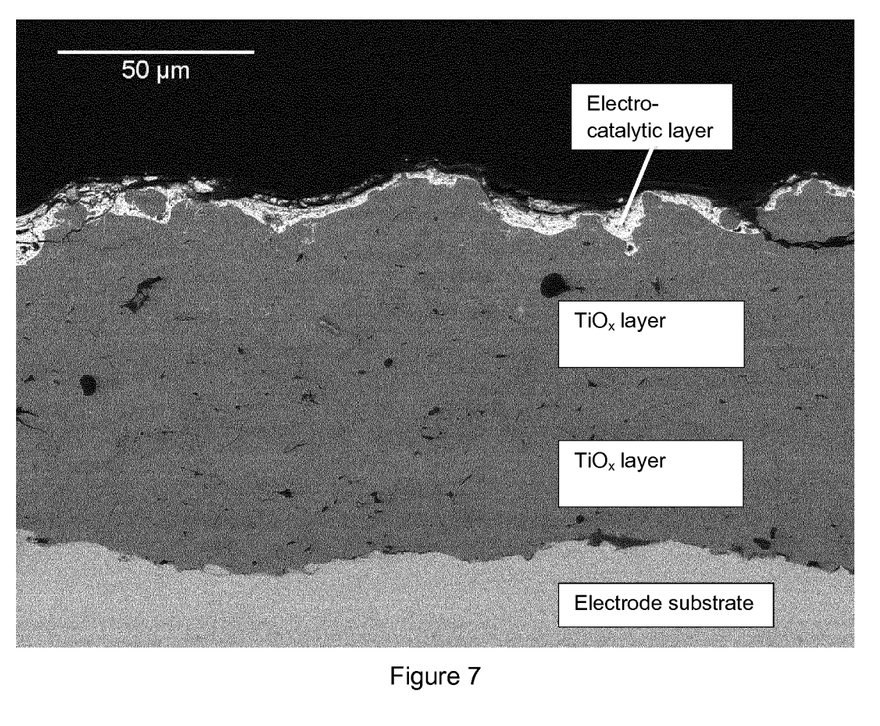
FIG. 7 shows a cross section of an electrode according to an aspect of the present invention, after being used in an electrolytic process.

After this period the electrode (as a cathode) was removed and inspected. A cross section of the electrode acquired with scanning electron microscope (SEM) in backscattered detection mode is shown in FIG. 7. As can be seen from FIG. 7, no titanium hydride formation was detected indicating that no penetration of hydrogen (H2 and/or atomic hydrogen) to the electrode substrate had occurred when the layers of $TiO_x$ have the same porosity, i.e. a single layer. No delocalization of the electro-catalytic layer (white) within the layer of $TiO_x$ was observed.

During the 5 month period the electrode (as a cathode) maintained its cathodic efficiency, i.e. the production of hydrogen gas remained constant. Furthermore the electrode (as a cathode) maintained its potential in that no significant extra voltage was needed when a constant current was applied to maintain the electrolysis process.

Having thus described the present invention and the advantages thereof, it should be appreciated that the various aspects and embodiments of the present invention as disclosed herein are merely illustrative of specific ways to make and use the invention. The various aspects and embodiments of the present invention do not limit the scope of the invention when taken into consideration with the appended claims and the foregoing detailed description.

What is desired to be protected by letters patent is set forth in the following claims.

What is claimed is:

1. A cathode comprising:
   a cathode substrate that is titanium and has at least one surface;
   at least one layer of $TiO_x$ with a total thickness of from 40 to 200 µm and wherein the at least one layer of $TiO_x$ is disposed on and in direct contact with the at least one surface of the cathode substrate, wherein a porosity of the at least one layer of $TiO_x$ is below 15%; and
   an electro-catalytic layer comprising oxides of ruthenium and cerium comprising ruthenium oxide in an amount of from 50 to 95 molar % and cerium oxide in an amount of from 5 to 25 molar %, the electro-catalytic layer being disposed on and in direct contact with the at least one layer of $TiO_x$,
   wherein x is from 1 to 2 for the at least one layer of $TiO_x$;
   wherein said at least one layer of $TiO_x$ comprises a single layer being at least 40 µm or two or more layers of $TiO_x$ where each layer of $TiO_x$ is at least 20 µm; and
   where the cathode is resilient to hydrogen diffusing to the cathode substrate during use thereof in an electrolytic process.

2. The cathode according to claim 1, wherein the at least one layer of $TiO_x$ comprises at least 50 molar % $TiO_x$ and the cathode is devoid of cracking.

3. The cathode according to claim 1, wherein the at least one layer of $TiO_x$ includes a first layer of $TiO_x$ and a second layer of $TiO_x$ with the first layer of $TiO_x$ having a porosity lower than the second layer of $TiO_x$.

4. The cathode according to claim 1, wherein the at least one layer of TiOx includes a first layer of $TiO_x$ and a second layer of $TiO_x$, and a thickness of the first layer of TiOx is from 20 to 120 µm and a thickness of the second layer of TiOx is from 20 to 120 µm such that the total thickness of the first layer of $TiO_x$ and second layer of $TiO_x$ does not exceed 200 µm.

5. The cathode according to claim 1, wherein the at least one layer of $TiO_x$ comprises oxides of chromium.

6. The cathode according to claim 1, wherein x is from 1.6 to 1.9 for the at least one layer of $TiO_x$.

7. The cathode according to claim 1, wherein the electro-catalytic layer provides a ruthenium content of from 2 to 25 g/m2.

8. The cathode according to claim 1, wherein at least 95% of the ruthenium from the electro-catalytic layer penetrates the at least one layer of $TiO_x$ to no more than 30% of a total thickness of the at least one layer of $TiO_x$.

9. An electrolytic process comprising the step of electrolytically generating hydrogen gas at the cathode of claim 1.

10. A process of manufacturing an cathode that is resilient to hydrogen diffusing to the cathode substrate during use thereof in an electrolytic process, the process comprising the steps of:
  i) providing a cathode substrate that is titanium and that has at least one surface;
  ii) coating the at least one surface of the cathode substrate by plasma spraying to form at least one layer of $TiO_x$ with a total thickness of from 40 to 200 µm and wherein the at least one layer of $TiO_x$ is disposed on and in direct contact with the at least one surface of the cathode substrate to provide a porosity of the at least one layer of $TiO_x$ of below 15%; and
  iii) forming an electro-catalytic layer comprising oxides of ruthenium and cerium comprising ruthenium oxide in an amount of from 50 to 95 molar % and cerium oxide in an amount of from 5 to 25 molar %, the electro-catalytic layer being disposed on and in direct contact with the at least one layer of $TiO_x$, wherein x is from 1 to 2 for the at least one layer of $TiO_x$ and wherein the at least one layer of $TiO_x$ comprises a single layer being at least 40 µm or two or more layers of $TiO_x$ where each layer of $TiO_x$ is at least 20 µm.

11. The process according to claim 10, wherein the at least one surface of the cathode substrate is roughened to provide an $R_a$ value of from 1 to 6 µm prior to step ii).

12. The process according to claim 10, wherein forming the electro-catalytic layer on the at least one layer of $TiO_x$ comprises a heating step and a thermolysis step of a combination of ruthenium and cerium compounds.

13. The process according to claim 12, wherein the heating step is carried out for a time of from 5 to 15 minutes at a temperature of from 70 to 100° C.

14. The process according to claim 12, wherein the thermolysis step is carried out for a time of from 10 to 15 minutes at a temperature of from 450 to 550° C.

15. The cathode of claim 1 wherein the at least one layer of $TiO_x$ includes a first layer of $TiO_x$ and a second layer of $TiO_x$, and a thickness of the first layer is from 35 to 65 µm and a thickness of the second layer is from 35 to 100 µm.

16. The cathode of claim 15 wherein the porosity of the second layer is from 3 to 21%.

17. The cathode of claim 16 wherein x is from 1.6 to 1.9 for the first and second layers of $TiO_x$.

18. The cathode of claim 1 comprising from 10 to 15 g/cm² ruthenium and wherein
  the at least one layer of $TiO_x$ includes a first layer of $TiO_x$ and a second layer of $TiO_x$, and a thickness of the first layer is from 35 to 65 µm and a thickness of the second layer is from 35 to 100 µm;
  the porosity of the second layer is from 3 to 21%; and
  x is from 1.6 to 1.9 for the first and second layers of $TiO_x$.

19. The cathode of claim 1, wherein the electro-catalytic layer consists of ruthenium oxide in an amount of from 50 to 95 molar %, cerium oxide in an amount of from 5 to 25 molar % and any one of titanium, zirconium and lanthanum or any combination thereof.

20. The cathode of claim 1, wherein the electro-catalytic layer comprises ruthenium oxide in an amount of from 75 to 90 molar % and cerium oxide in an amount of from 10 to 25 molar %.

21. The cathode of claim 1, wherein the cathode substrate is titanium selected from Commercially Pure Grade 1 Titanium, Commercially Pure Grade 2 Titanium, Commercially Pure Grade 4 Titanium, Commercially Pure Grade 7 Titanium, Commercially Pure Grade 11 Titanium and Commercially Pure Grade 12 Titanium.

22. The cathode of claim 3 wherein the at least one layer of $TiO_x$ includes a first layer of $TiO_x$ and a second layer of $TiO_x$ disposed on and in direct contact with the first layer, wherein the first and second layers have a total thickness of from 70 to 160 µm and wherein the first and second layers are disposed on and in direct contact with the at least one surface of the cathode substrate wherein a porosity of the first layer is from 2 to 5% and is the same or lowers than a porosity of the second layer.

23. The method according to claim 9, wherein the cathode is disposed in a chlorate cell that is polarised to a current density of between 0.8 to 5 kA/m2.

24. The method according to claim 9, wherein the cathode is disposed in a chlorate cell that is polarised to a current density of between 2 to 3 kA/m2.

* * * * *

UNITED STATES PATENT AND TRADEMARK OFFICE
CERTIFICATE OF CORRECTION

| | |
|---|---|
| PATENT NO. | : 11,326,266 B2 |
| APPLICATION NO. | : 15/761127 |
| DATED | : May 10, 2022 |
| INVENTOR(S) | : Magnus Rosvall et al. |

It is certified that error appears in the above-identified patent and that said Letters Patent is hereby corrected as shown below:

On the Title Page

In item (71) the Applicant section, the Applicant name "Akzo Nobel Chemicals International B.V." should read --NOURYON CHEMICALS INTERNATIONAL B.V.--

Signed and Sealed this
Thirteenth Day of December, 2022

Katherine Kelly Vidal
*Director of the United States Patent and Trademark Office*